UNITED STATES PATENT OFFICE.

JAKOB SCHMID, OF BASLE, SWITZERLAND, ASSIGNOR TO THE SOCIETY OF CHEMICAL INDUSTRY IN BASLE, OF SAME PLACE.

BLUE DYE.

SPECIFICATION forming part of Letters Patent No. 557,436, dated March 31, 1896.

Application filed September 5, 1895. Serial No. 561,572. (Specimens.)

*To all whom it may concern:*

Be it known that I, JAKOB SCHMID, a citizen of Switzerland, residing at Basle, Switzerland, have invented new and useful Improvements in the Production of Violet-Blue Polyazo Dyestuffs or Coloring-Matters, of which the following is a specification.

In another application for a patent, filed September 5, 1895, Serial No. 561,571, I have described the production of new polyazo dyes derived from amidonaphtholsulfo-acid, and the new intermediate products being obtained by coupling together two molecules of the tetrazo bodies of benzidin or analogous compounds with one molecular proportion of 1.8 amidonaphthol, 3.6 disulfonic acid, or 1.8 dioxynaphthalene, 3.6 disulfonic acid, which intermediate products correspond to the general formula:

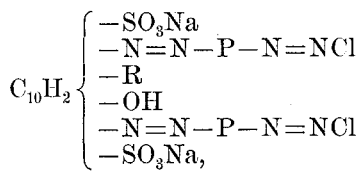

where R signifies $NH_2$ or OH and P the radicle of benzidin, methylbenzidin, ethoxybenzidin, tolidin, diamidostilbene, diamidodiphenylamin, diamidodiphenylether.

I herewith describe more particularly the violet-blue to blue coloring-matters derived from the above-mentioned new intermediate products and two molecules of 1.4 naphtholmonosulfonate of soda, or one molecule of this component and one molecule of another component, such as amidonaphtholsulfonate of soda.

In carrying out my invention practically I proceed as follows: Into the tetrazo compound derived from 18.4 kilograms of benzidin a cooled alkaline solution of eighteen kilograms of 1.8 amidonaphthol and 3.6 disulfonate of soda is introduced. The mixture is allowed to stand until tetrazodiphenyl has disappeared, when a solution of twenty-five kilograms of 1.4 naphtholmonosulfonate of soda (or 12.5 kilos of this component and 13.5 kilos of amidonaphtholmonosulfo-acid G) is added.

The new coloring-matter is precipitated with common salt, filtered and dried. It forms a black powder with metallic luster easily soluble in water with a violet coloration, in concentrated sulfuric acid with a blue coloration, from which solution the free color acid separates out by addition of water. It is insoluble in alcohol, ether, and benzene and dyes unmordanted cotton in a neutral or alkaline bath dark violet blue to blue.

The formula of the finished product when benzidine is used is as follows:

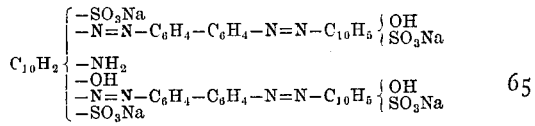

What I claim as new, and desire to secure by Letters Patent, is—

The dark violet-blue to blue polyazo dyestuffs which can be obtained by the action of 1.4 naphtholmonosulfonate of soda upon the intermediate products which have the general formula:

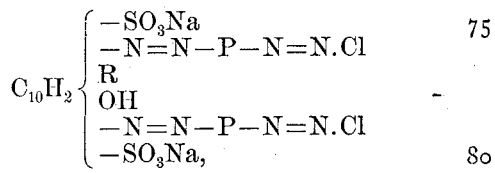

and which form black powders of metallic luster soluble in water with a violet, in concentrated sulfuric acid with a blue coloration, from which solution the free color acid separates out by addition of water; they are insoluble in alcohol, ether and benzene, and dye unmordanted cotton in a neutral or alkaline bath dark violet to pure blue shades, substantially as described.

In testimony whereof I have hereunto set my hand in the presence of two subscribing witnesses.

JAKOB SCHMID.

Witnesses:
 GEORGE GIFFORD,
 FRITZ WALTERS.